US006944612B2

(12) United States Patent
Roustant et al.

(10) Patent No.: US 6,944,612 B2
(45) Date of Patent: Sep. 13, 2005

(54) STRUCTURED CONTEXTUAL CLUSTERING METHOD AND SYSTEM IN A FEDERATED SEARCH ENGINE

(75) Inventors: Bruno Roustant, Gieres (FR); Pierre-Yves Chevalier, Biviers (FR); Yves Mahe, Corenc (FR)

(73) Assignee: Xerox Corporation, Stamford, CT (US)

( * ) Notice: Subject to any disclaimer, the term of this patent is extended or adjusted under 35 U.S.C. 154(b) by 291 days.

(21) Appl. No.: 10/065,731

(22) Filed: Nov. 13, 2002

(65) Prior Publication Data

US 2004/0093321 A1 May 13, 2004

(51) Int. Cl.⁷ ................................................. B06F 17/30
(52) U.S. Cl. ................................. 707/3; 707/1; 707/10; 715/517; 715/512; 715/513; 715/537
(58) Field of Search .............................. 707/1, 2, 3, 10, 707/6, 5, 100, 101; 717/8; 715/517, 512, 513, 537

(56) References Cited

U.S. PATENT DOCUMENTS

| 5,590,250 | A | 12/1996 | Lamping et al. | 395/127 |
|---|---|---|---|---|
| 5,721,939 | A | 2/1998 | Kaplan | 395/759 |
| 5,924,090 | A | 7/1999 | Krellenstein | 707/5 |
| 6,085,186 | A | 7/2000 | Christianson et al. | 707/3 |
| 6,102,969 | A | 8/2000 | Christianson et al. | 717/8 |
| 6,167,369 | A | 12/2000 | Schulze | 704/9 |
| 6,385,602 | B1 | 5/2002 | Tso et al. | 707/3 |
| 6,754,626 | B2 * | 6/2004 | Epstein | 704/235 |
| 2002/0099701 | A1 | 7/2002 | Rippich | 707/5 |

OTHER PUBLICATIONS

Zamir et al., "A dynamic clustering interface to web search results",.*
Adami et al., "Clustering documents in a web directory", ACM, pp. 66–73.*
Li et al., "Combining character based bigrams with word based bigrams in contextual postprocessing for chinese script recognition", ACM, vol. 1, No. 4, Dec. 2002, p. 297–309.*
El–Yaniv et al., "Distribution word cluster Vs. words for text categorization",.*
Wen et al., "Probabilistic model for contextual retrieval".*
Zellweger et al., "City lights:contextual views in minimal space".*
Jiang et al., "Mining cohenrent gene clusters from gene–sample–time microarrar data", ACM, pp. 430–439.*
Qin et al., "Optimizing software cache coherent cluster architectures", IEEE, pp. 1–19.*

(Continued)

Primary Examiner—Jean M. Corrielus

(57) ABSTRACT

A federated search engine groups search results from information sources using attributes of the search results. In grouping the search results, a first set and a second set of attributes are extracted from content in each set of search results received using information source wrappers. The first set of attributes defines a main clustering strategy, and the second set of attributes defines a sub-clustering strategy. A main grouping of the sets of search results received from the information sources is generated using the first set of attributes. The main grouping of search results includes a plurality of labeled groups with a plurality of search results in each group. A sub-grouping of search results is generated for each labeled group of search results in the main grouping of search results using the second set of attributes.

20 Claims, 5 Drawing Sheets

OTHER PUBLICATIONS

Jiang et al., "Interactive exploration of coherent patterns in time–series gene expression data", ACM, pp. 565–570.*

Jiang et al., "Application scaling under shared virtual memory on a cluster of SMPs", ACM, pp. 165–174.*

Kin et al., "Semi–supervised document clustering techique for information organization", ACM, pp. 30–.*

Wang et al., "Clustering by pattern similarity in large data sets", ACM, pp. 394–.*

Jiang et al., "Toward interactive exploration of gene expression patterns", ACM, vol. 5, isuue 2, pp. 79–90.*

D.P. Kottke "Spatially coherent clustering Applied to cardiac angiograms"IEEE, pp. 11–12.*

Bohm et al., "Computing clusters of correlation connected objects".*

Gaussier et al., "Categorization—A Hierarchical Model for Clustering and Categorising Documents", Lecture Notes in Computer Science, No. 2291, p. 229–247, 2002.

Hull et al., "Document routing as statistical classification". In AAAI Spring Symposium on Machine Learning in Information Access, Palo Alto, CA, Mar. 1996.

Zamir et al., "Grouper: a dynamic clustering interface to Web search results", Computer Networks—the International Journal of Computer and Telecommunications Networking, vol. 31, No. 11, p. 1361–1374, 1999.

U.S. Appl. No. 09/361,496, filed Jul. 26, 1999, entitled "System and Method of Automatic Wrapper Grammar Gerrneration". (D/99399).

U.S. Appl. No. 09/982,236, filed Oct. 19, 2001, entitled "Methods, Systems, and Articles of Manufacture for Soft Hierarchical Clustering of Co–occuring Objects". (D/A0A25).

U.S. Appl. No. 10/262,614, filed Oct. 2, 2002, entitled "Method and System for Improving Answer Relevance in Meta–Search Engines". (D/A1471).

U.S. Appl. No. 10/277,662, filed Oct. 21, 2002, entitled "Method for Automatic Wrapper Repair". (D/A1705).

* cited by examiner

FIG. 4

STRUCTURED CONTEXTUAL CLUSTERING METHOD AND SYSTEM IN A FEDERATED SEARCH ENGINE

BACKGROUND OF INVENTION

The present invention relates generally to the field of computer-based information retrieval, and more particularly to search engines that generate a coherent synthesis of relevant search results.

Individual search engines have facilitated the access to data published on networks such as the Internet or intranets. However, individual search engines are subject to certain limitations, and this has resulted in the creation of federated search engines that exploit other information sources, including individual search engines, in order to provide a better answer to user queries. Federated search engines do not store a document collection; instead, federated search engines forward user queries to external information sources in order to retrieve relevant data using wrappers that specify the interaction with information sources.

Unlike individual search engines, federated search engines provide a single user interface for accessing multiple information sources that vary in content. However, this only increases the amount of information a search may uncover. Similar to individual search engines, federated search engines need to distill search results in a concise and coherent manner so that users may readily identify what they are looking for. Many search engines distill search results for a user by computing a score using preset criteria and ranking the search results based on the computed score. In addition, search engines help users locate information in search results they are looking for by clustering search results into groups or categories based on the characteristics of the search results.

Notwithstanding such advances made to help users locate information in search results, there continues to be a need to provide improved methods for distilling and presenting search results to users so that they more readily locate the information they are searching for. In addition, it would be advantageous if such improved methods not only helped users identify what they are looking for but also gain knowledge concerning the information they are looking for. Accordingly it would be advantageous to allow users of search engines to simultaneously locate information and knowledge concerning information related thereto in the search results.

SUMMARY OF INVENTION

In accordance with the invention, structured contextual clustering is used to evaluate and present search results. While structured clustering concerns the imposition of structure on search results by identifying attributes of the content of the search results, contextual clustering concerns the use of search keywords to label search results grouped into clusters. Together structure contextual clustering allows users to discover additional knowledge concerning search results received from search engines.

In accordance with one aspect of the invention, there is provided a search engine, method and article of manufacture therefore, in which search results received from information sources are grouped and presented to a user. In grouping the search results, the search engine receives a query with user-selected keywords to be evaluated in an information domain. A plurality of information sources associated with the information domain are identified. The query is submitted to at least two of the plurality of information sources identified. A set of search results is received from the at least two information source for the query submitted thereto. A plurality of attributes are extracted from content in each set of search results received using information source wrappers. A first set and a second set of the plurality of attributes are specified. The first set defines a main clustering strategy, and the second set defines a sub-clustering strategy. Each clustering strategy defines a unique set of attributes that may be extracted from the content of search results using the information source wrappers. A main grouping of the sets of search results received from the information sources is generated using the first set of attributes. The main grouping of search results includes a plurality of labeled groups with a plurality of search results in each group. A sub-grouping of search results is generated for each labeled group of search results in the main grouping of search results using the second set of attributes.

In accordance with another aspect of the invention, there is provided a method, article of manufacture and apparatus therefor, for grouping search results in an information source. A query is received by the information source with user-selected keywords to be evaluated in an information domain of the information source. The information domain of the information source is queried using the received query. A set of search results is identified for the query submitted to the information domain of the information source. A plurality of attributes are extracted from content in the set of search results received for the submitted query. A first set and a second set of the plurality of attributes are specified. The first set defines a main clustering strategy, and the second set defines a sub-clustering strategy. Each clustering strategy defines a unique set of attributes that may be extracted from the content of search results. A main grouping of the sets of search results received from the information sources is generated using the first set of attributes. The main grouping of search results includes a plurality of labeled groups with a plurality of search results in each group. A sub-grouping of search results is generated for each labeled group of search results in the main grouping of search results using the second set of attributes.

BRIEF DESCRIPTION OF DRAWINGS

These and other aspects of the invention will become apparent from the following description read in conjunction with the accompanying drawings wherein the same reference numerals have been applied to like parts and in which:

FIG. 4 illustrates an example user interface of the user computers communicating with the federated search engine shown in FIG. 1.

DETAILED DESCRIPTION

A. Structure Contextual Clustering

Figure 1:
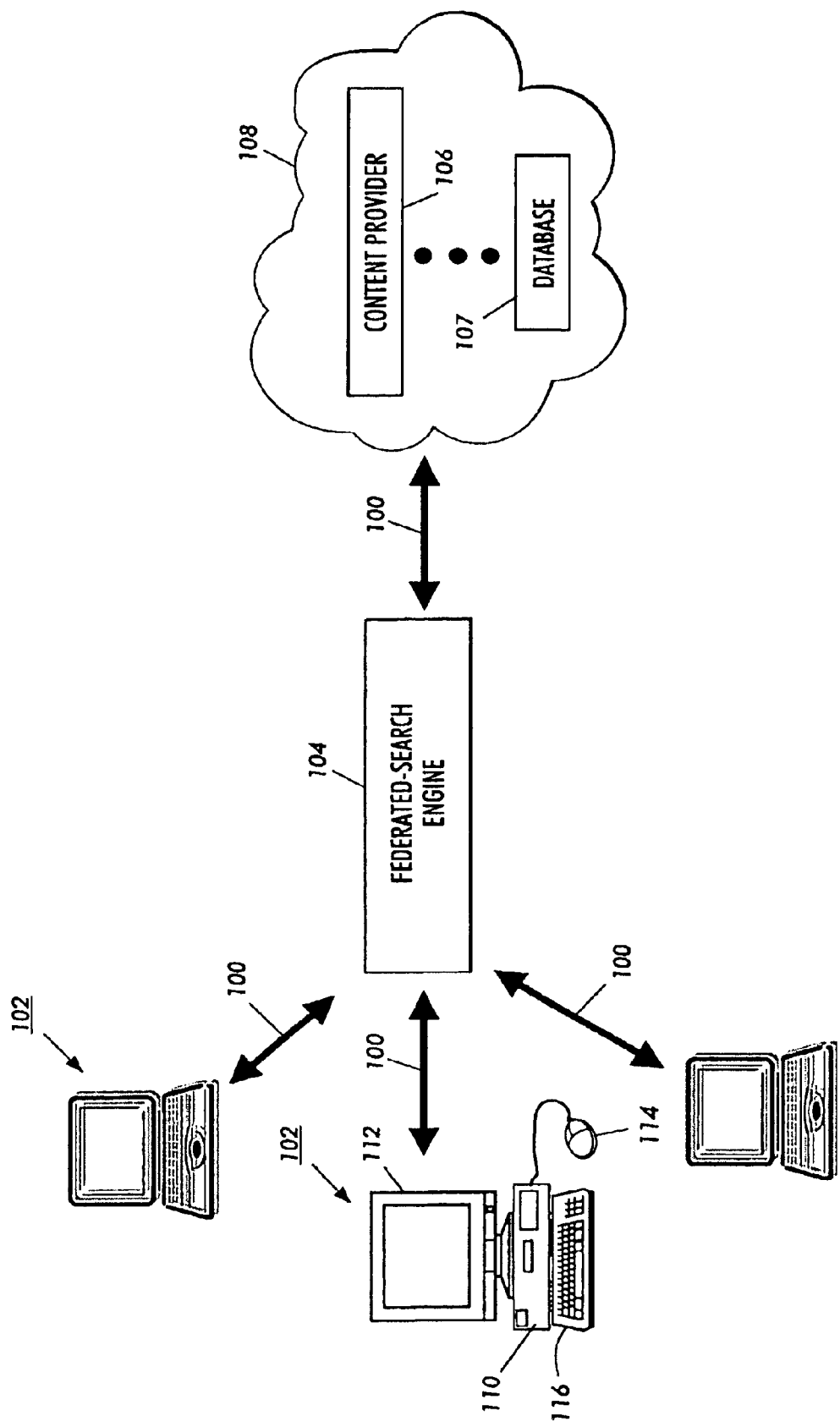
FIG. 1 illustrates an example operating environment with a federated search engine for performing the present invention.

FIG. 1 illustrates an example operating environment with a federated search engine for performing the present invention. In the operating environment, a network 100, such as the Internet or an intranet, operatively couples at least one user computer 102, a federated search engine 104, and a plurality of content providers 106 and/or databases 107 (generally referred to herein as information sources 108). The user computer 102 may include a processing unit 110, display 112, pointing device 114, and keyboard 116.

Figure 2:
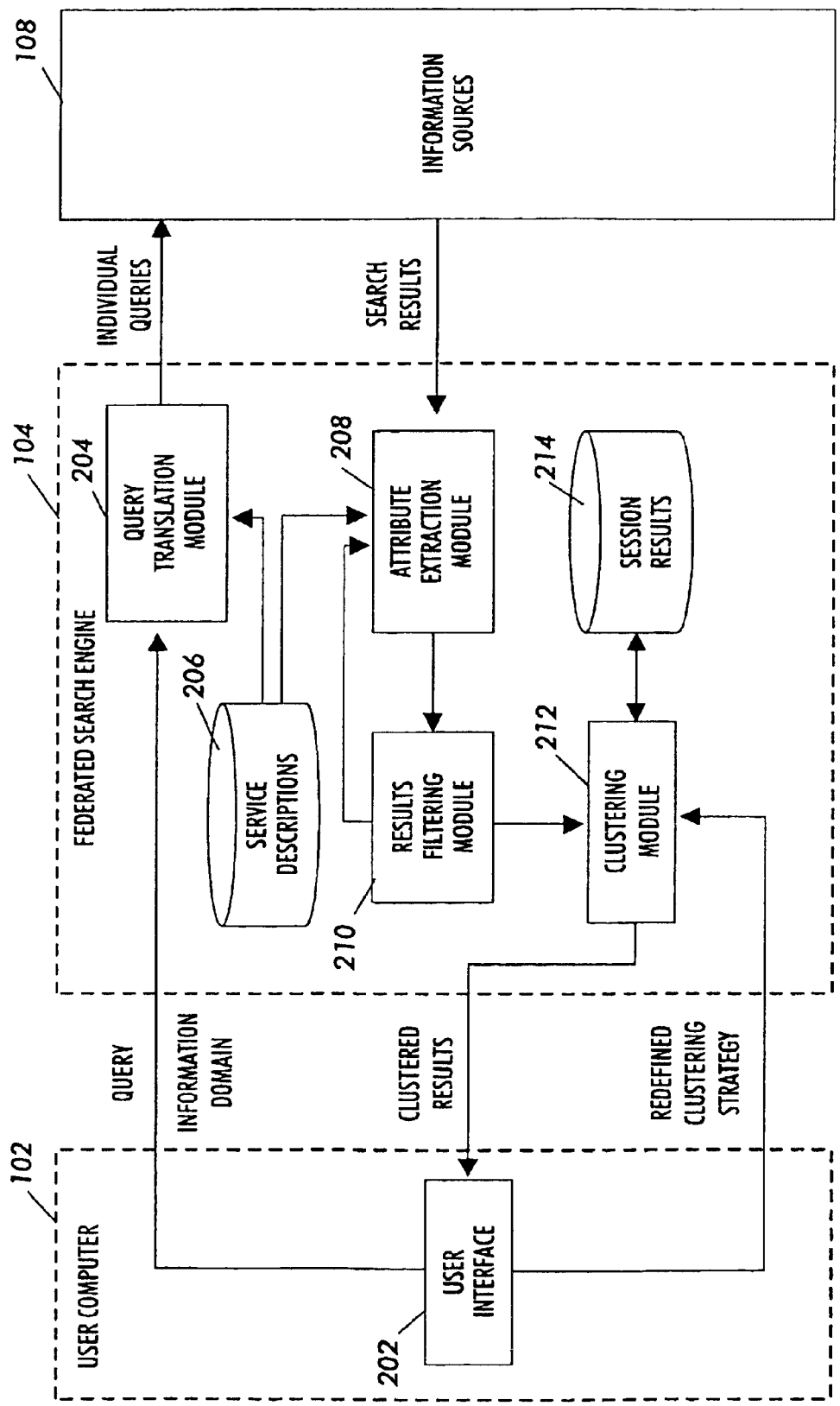
FIG. 2 illustrates a detailed block diagram of the components of the federated search engine for carrying out structured contextual clustering.
Figure 3:
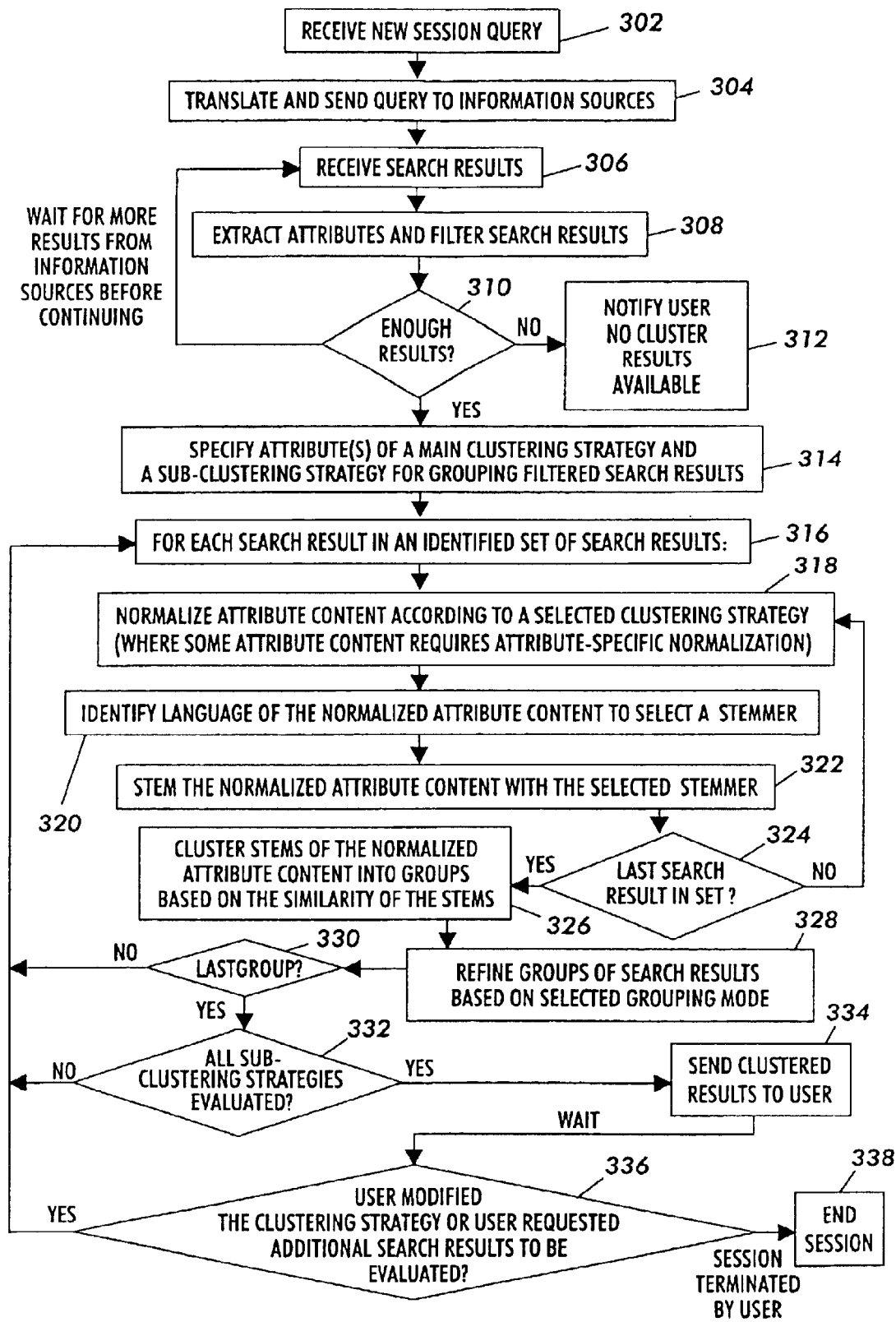
FIG. 3 is a flow diagram setting forth the actions performed by the federated search engine to provide structural contextual clustering.

FIG. 2 illustrates a detailed block diagram of the components of the federated search engine 104 for carrying out structured contextual clustering. FIG. 3 is a flow diagram setting forth the actions performed by the federated search engine 104 to provide structured contextual clustering. FIG. 3 will be described below while simultaneously referring to components of the federated search engine 104 shown in FIG. 2.

Initially at 302 in FIG. 3, a new session query is received from a user computer 102 by the federated search engine 104. The new session query may be formulated by a user at a user interface 202 operating at a display of the user computer 102. The user interface 202 of the user computer 102 is adapted to send a query, receive query results, and send feedback concerning the results to the federated search engine 140. The user interface 202 may in whole or in part include functionality forming part of an Internet browser (or web browser) such as Microsoft's Internet Explorer that is adapted to receive and transmit data through a series of web pages.

Figure 4:
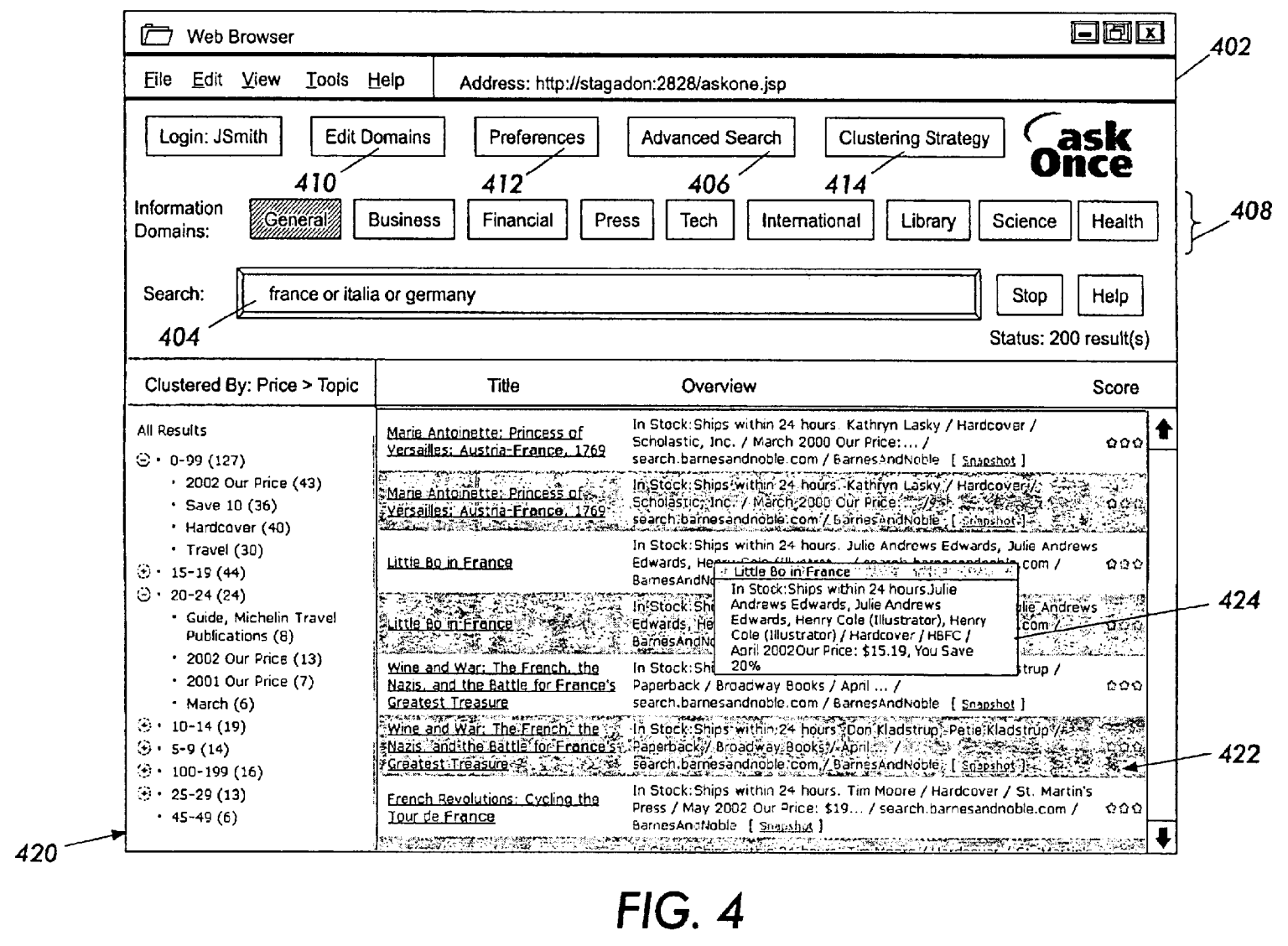

An example user interface 402 of the user computer 102 is illustrated in FIG. 4. During formulation of a session query, a user composes a query in frame 404 by entering keywords (i.e., user-selected keywords) and possibly operators (i.e., user-selected operators) that define relationships between the user-selected keywords. In addition, the user can specify advanced search properties at 406. Also as part of session query formulation, the user may select an information domain 408 to specify which information sources are to be interrogated with the composed query. The information domains 408 may be predefined by the federated search engine 104 or defined by a user at 410.

In another embodiment if no information domain is selected by a user, the federated search engine 104 may be preprogrammed to automatically select information sources depending on, for example, keywords of the query specified by the user. For instance, certain keywords could imply a specific field, so that specialized information sources may be selected to ensure a certain answer relevance of the query. In yet another embodiment, if no information domain is selected by a user, the federated search engine defaults the information domain to a general information domain that identifies general search engines as information sources.

At 304 in FIG. 3, after receiving a query from the user computer 102, the query translation module 204 of the federated search engine 104 translates and sends the query to the information sources associated with the selected information domain. Depending on the information source a subsumption of non-supported operators may be required when the query is translated into a target query language appropriate for each information source. Query subsumption may thus occur during translation if an information source does not support certain features of the federated search engine query language.

Generally, a subsumption of a non-supported operator is performed by replacing the non-supported operator by a set of one or more supported operators (i.e., operators supported by the selected information source) that will provide at least the same set of answers as the non-supported operator, thereby subsuming the non-supported operator. For example, if an information source does not support a query with phrases, each phrase can be replaced with a Boolean AND over all terms composing the phrase.

Once translated, the query is sent to each of the selected information sources 108 using wrappers of information sources stored in service descriptions memory 206. The wrappers, which can control data flow from the information sources, specify the appropriate protocol, format, and syntax (e.g., available operators) for querying a selected information source. Generally, the federated search engine 104 does not have any documents available (although it may have some in limited situations) that it queries directly, but instead queries independent information sources 108 to find answers to a user submitted query using the information source wrappers. More information concerning the creation of wrappers for information sources is disclosed in U.S. patent application Ser. Nos. 09/361,496 and 10/277,662, which are incorporated herein by reference.

At 306 in FIG. 3, the federated search engine 104 receives, at attribute extraction module 208 (shown in FIG. 2), summaries of documents considered relevant in response to a query submission to an identified information source. Attributes of content of the responses to each query submission (i.e., raw results) are extracted at 308. That is at 308, attributes of the content of raw results are extracted either directly from the content or directly through attributes included with the search results; the exact extraction method depending on whether and to what degree the search results from the information sources contains structured data. Attributes of structured or unstructured data may for example include: title, date, topic, author, source, size, collection, price etc.

Also at 308, certain attributes that are extracted (e.g., dates, authors, sizes, collection, price) are normalized to a single predefined format. For example all attributes that are dates are formatted to a single pre-defined or uniform format (e.g., 2004-04-01 and not April 1, 2004 or 4/1/04), while all file sizes are formatted to a single pre-defined unit of measurement (e.g., Kbytes). Generally, this is a first stage of normalization during which certain attributes are converted to a common format or measure.

In addition at 308, the raw results are filtered by a results filtering module 210 (shown in FIG. 2) to eliminate results that do not satisfy the user-selected keywords. This may be due to query translation and subsumption of certain operators. The raw results may be filtered the following ways: (a) results with a score (e.g., provided by the information source with the raw data and/or computed or recomputed by the federated search engine based on user-selected keywords, using a relevancy ranking method) below a predefined threshold score are discarded; (b) results that do not satisfy the user-selected keywords (including subsumed queries) are discarded; and (c) results that are duplicates are discarded.

At 310, if enough filtered results remain, clustering module 212 (shown in FIG. 2) of the federated search engine begins the clustering of the filtered search results; otherwise, the federated search engine either waits for additional results at 306 or terminates the search at 312 by sending the user computer 102 that initiated the query session that no cluster results are available; however at 312, any available search results are displayed at the user computer.

The clustering module 212 begins clustering the filtered results at 314 in FIG. 3. In one embodiment at 314, attributes defining a main clustering strategy and a sub-clustering strategy are defined based on wrapper specifications for extracting attributes from selected information sources. Each clustering strategy defines a unique set of attributes that are used to group the search results filtered at 308. In another embodiment at 314, initially only a main clustering strategy is defined, and the sub-clustering strategy is defined only after a first grouping of the filtered search results is returned to the user computer 102.

In either embodiment, initially attributes of the main clustering strategy and the sub-clustering strategy and/or the number of levels in a strategy are defined by either: (a) default values of the federated search engine; (b) preset user preferences (set at 412 in FIG. 4); or (c) a combination of (a) and (b). Also, in either embodiment, the number of sub-clustering-strategies is not limited to defining a single sub-clustering strategy, instead a plurality of sub-clustering strategies may be defined.

Advantageously, the hierarchy of a main clustering strategy and a sub-clustering strategy allows users to identify trends, experts, and areas of interest, thereby transforming the federated search engine into a knowledge discovery tool. For example, a main clustering strategy identifying specifying the author attribute will identify groups of authors having published in the area specified by the query. In addition, by specifying a sub-clustering strategy specifying the topic attribute will identify sub-groups of topics published by the authors within each group of authors, thereby permitting the identification of experts in certain fields, as discussed in more detail below in section D.

At 316, for each filtered search result in an identified set of search results the actions 318, 320, and 322 are performed. Each search result is defined herein as an answer (e.g., a document or summary of a document) received from a queried information source. Initially, the identified set of search results to which the main clustering strategy is applied consists of the search results filtered at 308.

At 318, the attribute content of an identified search result is normalized according to a selected clustering strategy. Initially, the selected clustering strategy is the main clustering strategy. In one embodiment, the attribute content is normalized by tokenizing the attribute content using a basic language-independent tokenizer that uses spaces and punctuation marks to tokenize, such as finite-state machine tokenizer. The tokenizer can use finite-state technology to segment a sequence of input characters into an ordered sequence of tokens (i.e., basic units such as paragraphs, punctuation marks, numbers and words).

Additional background for tokenization is disclosed in U.S. Pat. No. 5,721,939, which is incorporated herein by reference. Depending on the attributes in the selected clustering strategy, certain attribute content (associated with identified attributes) requires attribute-specific normalization, the details of which are discussed below in section B. The identified attributes may include for example: author, date, collection, size, price, score, and numeric identifier.

Initially at 320, the language of the attribute content normalized at 318 is identified using a language guesser. In one embodiment, the language is identified at 320 using techniques disclosed in U.S. Pat. No. 6,167,369, entitled "Automatic Language Identification Using Both N-Gram And Word Information", which is incorporated herein by reference. The identified language is then used to select a stemmer specifically adapted for the identified language. In addition upon identifying the language of the attribute content at 320, language-specific pattern-based tokenizers may be used for the identified language of the attribute content to further tokenize the attribute content at 318.

Subsequently at 322, the normalized attribute content is stemmed using a stemmer corresponding to the identified language of the normalized attribute content. The stemmer reduces morphological variants of the normalized attribute content to stems or lemmas (i.e., roots), and removes stop (i.e., extremely common) words. A "morphological variant" is used herein to mean the conjugated form of a word or expression (e.g., plural form), or a derivational form of a word (e.g., presidential is a variant of president).

Morphological variants can be reduced to stems using known techniques such as Porter's stemming algorithm or lemmas using known morphological analysis techniques that take a surface form of a word (i.e., a form in which it appears in attribute content) and returns its lemma (i.e., the normalized form of a word that can be found in a dictionary such as the infinitive for verbs, the singular for nouns).

At 324, if there exist additional search results in the identified set of search results at 316 then acts at 318, 320 and 322 are repeated; otherwise at 326, stems of the normalized attribute content are used to cluster the identified set of search results into groups based on the similarity of the stems computed at 322. In one embodiment at 326, a preliminary set of clusters is created using a suffix comparison method that is applied on the stems of the normalized attribute content. In operation, the suffix comparison method detects all common suffixes between each of the stems of the normalized attribute content.

For one specific example, the search results provide the following three sets of attribute content, where each letter represents a word: set of attribute content $1=\{a, b, c, d\}$; set of attribute content $2=\{e, c, d, f\}$; and set of attribute content $3=\{g, h, b\}$. In this example four common suffixes are found between the three sets of attribute content: $\{c\}$, $\{d\}$, and $\{c, d\}$ are suffixes common to the sets of attribute content 1 and 2; and $\{b\}$ is a suffix common to the sets of attribute content 1 and 3. For each suffix common to at least 2 sets of attribute content, a preliminary cluster is created that groups the search results containing the stems of the normalized attribute content. In this example, two preliminary clusters are created: cluster 1 grouping search results 1 and 2 (with common suffix $\{c\}$, $\{d\}$, and $\{c, d\}$); and cluster 2 grouping search results 1 and 3 (with common suffix $\{b\}$).

Accordingly, at 326 groups of search results are structurally clustered according to the attributes of the search results. The attributes of search results the may or may not be structured. If they are not structured, the federated search engine evaluates the content of the search results to identify metadata therein. Thus, not only may attributes be used to define search criteria, and sort search results but they are also used herein to group and display results, thereby allowing for knowledge discovery by relations identified in their groupings and grouping labels identified at 328.

At 328, the groups of search results clustered at 326 are refined according to a user-selected grouping mode. Depending on the grouping mode selected, the number of groups identified as well as the number of search results in each group may be specified, the details of which are discussed below in section C.

At 330, for a sub-grouping clustering strategy, if all sub-groups have been evaluated then 332 is performed; otherwise, additional groups of search results are evaluated beginning at 316. In the case of the evaluation of the main clustering strategy, there will only ever exist one group of search results, which is the set of filtered search results at 308 (i.e., the answer at 330 will always be yes).

At 332, if all sub-clustering strategies have been evaluated then the clustered results are sent to the user computer at 334 for display at the user interface as illustrated in the example user interface shown in FIG. 4; otherwise 316 is repeated for the new sub-clustering strategy that is to be applied individually (at 330) to each group of search results refined at 328 (i.e., each being an identified set of search results at 316).

At 336, if after a predefined period of time the user operating the user computer 102 has not either modified (changed or added to) the clustering strategy originally specified at 314 or the user has not requested that additional search results received from information sources being evaluated, then the session is terminated at 338; otherwise beginning again at 316, the existing or new search results are group according to the existing or modified clustering strategy.

Figure 5:
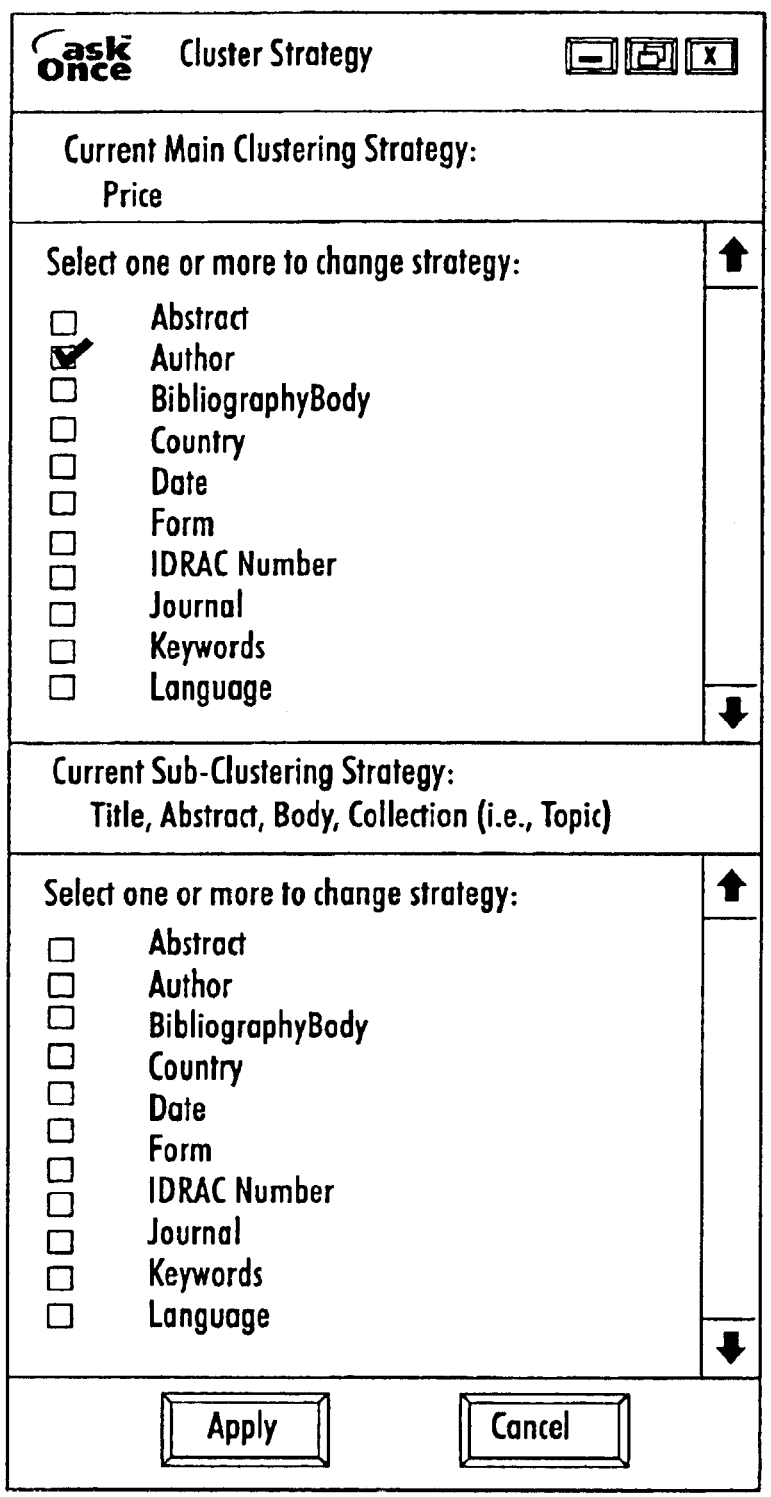
FIG. 5 illustrates an example window in which a user may select attributes to modify the main clustering strategy or the sub-clustering strategy.

FIG. 5 illustrates an example window in which a user may select attributes to modify the main clustering strategy or the sub-clustering strategy. Although only two levels of clustering strategies are shown in FIG. 5, it will be appreciated that any number of additional levels may be similarly added. The example window in FIG. 5 may for example be invoked at selection button 414 on the user interface shown in FIG. 4.

Search results filtered by the filtering module 210 and received by the clustering module 212 are recorded in session result memory 214 (as shown in FIG. 2). When a user changes the clustering strategy, the filtered results that are stored in session memory 214 are re-clustered according to the new or modified clustering strategy, eliminating the need to re-query the information sources. However, in the event the query (e.g., user-selected keywords) or the selected information domain is modified by the user during a session, then the query must be resubmitted to the information sources, thereby initiating a new session.

In another embodiment, the results returned at 334 include suggestions for a user to refine the search. The suggestions for refining the search are based on names or terms used to identify the clusters. Additional methods for refining search results are disclosed in U.S. patent application Ser. No. 10/262,614, which is incorporated herein by reference.

B. Attribute-Specific Normalization

This section concerns attribute-specific normalization techniques that may be used at 318 if certain attribute content (associated with identified attributes) is normalized. These attribute-specific normalization techniques are adapted to operate with clustering methods at 326 and 328 that groups search results by detecting common suffixes between attribute content. Initially, the content of each specific attribute that is to be normalized is first converted using the attribute-specific normalization techniques into a set of words, so that the clustering method is able to differentiate between standard 'text' attributes and specific attributes.

Described below in sections B.1–B.4 are four attribute-specific normalization techniques for converting attribute content to a string format that can be used later to cluster the search results. In general, the attribute-specific normalization techniques tokenizes the attribute while retaining the entire meaning of the attribute content (even if the attribute content contains multiple words or punctuation). In addition in general, the attribute-specific normalization techniques create a range of terms that are used to normalize specific attributes to a common term that identifies the greatest common meaning between different content having the attribute. This common term may later be identified by the clustering methods to find common suffixes (e.g., date, name, price).

B.1 Collection Attributes

The collection attribute contains the collection, or category, in which a search result may be classified (e.g., as a group within a predefined taxonomy). For example, a predefined taxonomy may be organized hierarchically, with the following labels at each level in the hierarchy: level 1: 'collection'; level 2: 'sub-collection'; and level 3: 'sub-sub-collection'. Each collection at each level may be composed of one or more words. To retain the meaning of each collection label, the collection-specific normalization technique retains the entire label even if spaces or punctuation can be found within the label.

In operation, first the collection-specific attribute normalization technique tokenizes labels identifying the organization of hierarchies for each collection attribute. Subsequently, the label with the greatest common meaning between the documents is identified. For example, assuming a first document is identified in the fourth level of the collection hierarchically ordered as follows: "Computer", "Software", "Knowledge Management", "Supplier". In addition, assume a second document is identified in the third level of the collection hierarchically ordered as follows: "Business", "Knowledge Management", "Services". The collection-specific attribute normalization of the first document and the second document would later be evaluated by the clustering methods to identify the common suffix "Knowledge Management" (i.e., the greatest common meaning in the collection hierarchies).

B.2 Author/Location Attributes

Author-specific attributes are sought to be normalized to an ordered list of first name and then last name (e.g., 'first name1' 'last name1', 'first name2' 'last name2'). In normalizing author-specific attributes, the first and last name are differentiated so they are not compared to each other when the clustering methods detect suffixes. In one embodiment, a different letter is appended to the first name ('f') and the last name ('l') to separately identify each. Accordingly, author-specific attribute normalization involves correctly extracting authors by parsing punctuation, while accounting for exceptions such as a letter followed by a dot (i.e., where the letter possibly indicates an initial to a first or middle name) and certain stop words concatenating a first name and a last name (e.g., 'first name' van 'last name', or 'first name' de 'last name').

The author-specific normalized attribute content is composed of one or more phrases, one for each separate author. For example, with the author phrases "John Smith, Adam Smith" for an identified document, then the normalized author attribute is composed of 2 separate phrases: "John"+f "Smith"+l; and "Adam"+f "Smith"+l. A first name cannot appear alone as a common suffix (e.g., "John"+f "Smith"+l). Instead, each first name must be followed by the last name in a suffix, thereby eliminating the later grouping of search results by first names only.

In another embodiment, other names such as company names are processed in a similar manner to author names. In these and other embodiments, an entity extractor may be used to find similar or related names when the content of attributes is normalized. It will also be appreciated that during normalization attributes can be normalized to attribute specific hierarchies. For example, company names may be added as part of the hierarchical order: industry, sector, company. Alternatively, city names may be added as part of the hierarchical order: continent, country, city.

B.3 Date Attributes

In one embodiment, date-specific attributes are normalized according to the following pattern: year-month-day. In normalizing a date-specific attribute, a date attribute is converted into a set of words by generating a set of date-ranges that tend to be identical to date-ranges generated for other date attributes. Using the set of date-ranges, the clustering method is able to automatically find date attributes with identical date-ranges by finding common suffixes.

In one embodiment, normalized date attribute content is arranged according to the pattern: year-range year month-range month day-range day. In addition, in this embodiment the date-ranges are produced according to the following principles: (a) year-range follows a 10 year range including the year; (b) month-range follows quarter-year periods that specify the months, where months are translated in text based on the display language of the user interface, so they are more easily distinguished from days; and (c) day-range follows an eight day range including the day. For example, the date in the format 2002-11-09 would be normalized to the value '2000–2009 2002 Oct–Dec Nov 09–16 09'.

Each date-range is marked so that common suffixes can only start at either year-range or month-range but no other range. This marking of date-ranges avoids grouping search results only by day-range. In addition, when generating a cluster name with a date-range suffix, year-range, month-range and day-range are not included as part of a cluster label (or name) if they are not the last word of the suffix. For example, if date suffix is '2000–2009 2002 Oct.–Dec Nov', then cluster name will be '2002 Nov' and if date suffix is '2000–2009 2002 Oct–Dec', then cluster name will be '2002 Oct–Dec'.

B.4 Numeric Attributes

A numeric-specific attribute is an attribute with numeric content such as price, size, score, or numeric identifier. Numeric-specific normalization converts numeric attributes into a set of words by generating standard numeric-ranges that may be identical to numeric-ranges generated for another similar numeric attribute. Defining ranges of numeric attributes allows the clustering methods to automatically find identical numeric-ranges by finding common suffixes. In one embodiment, the normalized numeric attribute content is normalized according to the following hierarchical ordering: 10000-range 5000-range 1000-range 500-range 100-range 50-range 10-range 5-range 'exact number'. The 10000-range or final range varies depending on the numeric attributes. For example, if a price attribute is 467.5, then after normalization the value of price will be: 0–9999 0–4999 0–999 400–499 450–499 460–469 467.5.

When generating a cluster name with a numeric-range suffix, only the last numeric-range of the suffix is used to define the cluster name, any other suffix is skipped. For example, if for the normalized price suffix will be equal to '0–9999 0–4999 0–999', then cluster name is assigned '0–999'.

C. Group Refinement and Naming

This section describes the details of refining groups of search results based on a selected grouping mode (as set forth in the flow diagram at 328 in FIG. 3). In one embodiment, a user is able to specify that results are refined using one of three different grouping modes. Generally, the grouping mode strategy is to avoid defining a large miscellaneous category or group, and to display a number of group according to the user preferences (i.e., some users prefer few clusters grouping many results, other may prefer many clusters grouping less results but greater focus). In addition, the grouping mode strategy takes into account the context of the search when selecting the more important clusters.

In one embodiment, the grouping modes may consist of either: a first grouping mode that defines approximately five groups that account for approximately 85% of the identified set of search results; a second grouping mode that defines approximately ten groups that account for approximately 65% of the identified set of search results; and a third grouping mode that defines approximately twenty groups that account for approximately 65% of the identified set of search results, where the third grouping mode produces a greater number of groups than the second grouping mode but each group, however, contains a more focused and/or narrower set of results.

After having computed preliminary clusters at 326, the preliminary clusters are merged according to the grouping mode by first identifying how many search results each group has in common with other groups (i.e., number of search results in common). Subsequently, for each set of two distinct preliminary clusters a and b, these clusters are merged if: (number of search results in common)/(number of search results of cluster a)≧(merging threshold) AND (number of search results in common)/(number of search results of cluster b)≧(merging threshold), where "merging threshold" is a number ranging from 0 to 1 depending on the grouping mode selected by the user.

Consequently, the merging threshold for the second grouping mode defined above is lower than the merging threshold for the third grouping mode since the second grouping mode defines fewer clusters than the third grouping mode. Preliminary clusters are very often merged when the merging threshold is low, resulting in the merging of preliminary clusters into groups that include a large number of search results. Generally, for any grouping mode that defines many clusters, the merging threshold is assigned a high value (e.g., >0.7). Preliminary clusters are less often merged when the merging threshold is high, resulting in expanding the number of preliminary clusters into groups that include fewer yet more focused search results.

In addition to group refinement, groups are named. Because the knowledge gained by individuals is based not only on how search results are clustered but also on how clusters are named. In one embodiment, cluster names are derived using short phrases (not disjoint words) that are representative of but are identified in attribute content extracted at 308 from the search results. In addition in another embodiment, the context of the search is used to evaluate cluster names by identifying and discarding cluster names that include phrases that are made entirely of user-selected keywords and/or stop words.

In one specific embodiment, cluster names are generated from suffixes. A cluster groups search results that share one or more suffixes. After merging preliminary clusters, the resulting clusters may group search results with different suffixes. The cluster naming method used to create cluster names selects the largest suffixes for each resulting cluster while adhering to the following rules: (a) the number of suffixes does not exceed two; (b) the selected suffixes length does not exceed three (where suffixes of length greater than three are skipped); (c) suffixes that are sub-strings of other suffixes of the cluster are skipped; (d) the number of search results sharing those suffixes are given greater value (i.e., suffixes shared by more search results are better).

Once the suffixes are selected, the cluster naming method extracts the parts of sentences corresponding to the suffix stems. Accordingly, the cluster name is a set of sentence parts including possibly stop words found between suffix stems. In addition, stems are replaced by their original words in the attribute content. By construction, the cluster name is a well formed phrase containing the relevant words shared by the search results grouped by the cluster.

Once clusters are merged and named, a score is computed for each cluster. This score takes into account: (a) the average score of the five best search results grouped in the cluster (note the score of the search results is computed at 308); (b) the merging score of the cluster (ranging from 0 to 1), based on the merging score computed for each of the preliminary clusters composing the resulting cluster, or 1 if the resulting cluster is composed of only one preliminary cluster; (c) the cluster size (number of search results it groups); (d) the cluster name length; and (e) the accuracy of the cluster name (regarding the user-selected keywords, any cluster with a name that is only composed of user-selected keyword and/or stop words is skipped) (the score of clusters with a name that includes only verbs is decreased).

As part of the general grouping mode strategy, the clusters of stems grouped at 326 are ranked by importance by selecting the clusters that offer the best coverage of search results while: (a) the number of selected clusters does not exceed the maximum number defined by the grouping mode; (b) the number of clusters is optimized depending on the grouping mode; and (c) the clusters score is taken into account to select the best clusters.

D. Examples of Knowledge Discovery

Advantageously, structure contextual clustering provides means for discovering new relationships between search results received from different information providers and generate new knowledge therefrom by clustering search results by different combinations of attributes at multiple levels. Accordingly using structured contextual clustering, federated search tools that query multiple sources can be used to discover knowledge from lists of search results.

As shown in the example user interface in FIG. 4, the search results are clustered by price at the top level (i.e., main clustering strategy) and then by topic at the lower level (i.e., sub-clustering strategy) as illustrated in frame 420. Depending on the level selected in frame 420 a user can view the search in groups at either a top level (e.g., "0–99") or in a lower level (e.g., "Travel") by selecting the desired clustering level in frame 420. Note the user can simply view all results without clustering by selecting all results in frame 420.

In the example shown in FIG. 4, search results are first clustered by price and then sub-clustered by topic. Selecting on a sub-cluster topic will identify only those search results that fall within the price cluster and relate to the sub-cluster topic, thereby allowing to refine the search results to fewer more relevant results. Also, depending on which result is being pointed to by the user's pointing device (e.g., mouse), a frame 424 will appear that summarizes the selected entry.

In addition, the user interface organizes search results in a manner that allows users to discover new information. In the example shown in FIG. 4, users are now able to identify certain classes of product (e.g., organized by topic) that fall within a certain price range. Further clustering of the sub-topic by a source attribute will identify the suppliers and/or producers of the items.

Generally, there exists a number of possible domains in which the structural contextual clustering performed in accordance with the present invention will permit the exploration and identification of knowledge such as relationships between results and trends in the results. Domains in which such analysis can be useful include: marketing, public relations, sales, technical watch, and asset management. Sections D.1–D.3 describe examples of three different applications.

D.1 Expert or Major Contributor Locator

In order to locate major contributors or experts in a field, the clustering strategy is defined with the main clustering strategy grouping by author and the sub-clustering strategy grouping by topic. In addition, the search can be focused to a specified information domain of interest (e.g., tech). Using these clustering strategies and the specified information domain, search results will be organized with top-level clusters of author names and sub-clusters organized by topic.

This clustering strategy allows groups of major publishers and the topics of publication to be readily identified in the specified information domain (or field). Once authors of interest and/or the topic of interest are identified as having similar elements in groups, the groups are redefined with a group identifying and grouping common authors of publications together. In addition, the search can be repeated while specifying a general information domain to expand the search to unrestricted information sources, thereby identifying related information on the topic.

In summary, the expert or major contributor locator begins with a search on specific information sources to identify key contributors and co-contributors of topics related to a particular field. In accordance with name-specific normalization, relationships between authors can be identified in the clusters of authors as well as their publication focus. Further searching on the identified authors and topics of interest using general information sources will identify information related to the authors, co-authors and their publication focus.

D.2 Trend Analysis

Trends on a particular topic (e.g., "malaria" in the information domain "science") can be identified by organizing search results with a main clustering strategy that groups by date and a sub-clustering strategy that groups by topic. For example, if the date-specific normalization identifies a first date cluster of Aug 2000 and a second date cluster of Nov 2000, then trends (e.g., activity such as discoveries in the science information domain, or mergers or new product announcements in the business domain) for the specified topic or search criteria (e.g., malaria) can be identified.

As set forth above, date-specific normalization enables the clustering methods to cluster search results by the most relevant date between the search results. For example, assets such as patents could be analyzed for a particular corporation using this method to identify trends or periods of time when activity took place and the topic of such activity. In an alternate example, market data for a class of product can be analyzed to identify past and emerging trends in a given market sector.

Information sources can further be used to identify sources of product, price, and quality. For example, defining a main clustering strategy that groups results by price and a sub-clustering strategy that groups results by source, and a sub-sub-clustering strategy that groups results by topic will identify the type of product or service available at a source in a particular price range. In this way, trends of a company's products and services can be evaluated with respect to, for example, price and type.

D.3 High-Value Information Source Location

Information sources available in the federated-search engine can be evaluated by grouping search results using a main clustering strategy that groups search results by journals and then using a sub-clustering strategy that groups results by topic. Using this clustering strategy on selected information sources will help identify what journals the information source carries as well as whether the journal publishes information on topics of interest to the user.

E. Miscellaneous

In yet another embodiment, the clustering module 212 in FIG. 2 is embedded as part of an information source, such as database. The interface to the information source would cluster search results in the manner set forth starting at 314 in FIG. 3. In this alternate embodiment, the clustering module 212 is used integrally with the information source to produce search results in response to a query, without querying information sources. It will be appreciated by those skilled in the art that querying performed on an information source is equivalent to browsing information sources. For example, an information source may therefore be a file system (e.g., NTFS), directory service (e.g., LDAP), or document management system (e.g., Documentum) that provides document file properties in response to a general directory query.

In a further embodiment of the invention, a two or three dimensional hyperbolic browser is used to view the clustered relationships. Hyperbolic browsers are disclosed in U.S. Pat. No. 5,590,250 and in the article by Lamping, J. and Rao, R., "The Hyperbolic Browser: A Focus+Context Technique for Visualizing Large Hierarchies," Sep. 5, 1995, which are incorporated herein by reference.

In an additional embodiment, a predefined clustering strategy merges attributes from information sources that organize documents in well defined collections of taxonomies and attributes from information sources that are not organized by a taxonomy. By merging their attributes, the unstructured information sources benefit from the taxonomies of the structured information sources. In accordance with this clustering strategy, the main clustering strategy groups search results by collection and title and the sub-clustering strategy by whatever attribute is of interest to the user. The collection-specific normalization of the multiple attributes (collection and title) effectively merges the information together to order to apply the structure of defined taxonomies to unstructured information sources.

Using the foregoing specification, the invention may be implemented as a machine (or system), process (or method), or article of manufacture by using standard programming and/or engineering techniques to produce programming software, firmware, hardware, or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the invention.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

It will be appreciated that various other alternatives, modifications, variations, improvements or other such equivalents of the teachings herein that may be presently unforeseen, unappreciated or subsequently made by others are also intended to be encompassed by the following claims.

What is claimed is:

1. A method for grouping search results received from information sources, comprising:

receiving a query with user-selected keywords to be evaluated in an information domain;

identifying a plurality of information sources associated with the information domain;

submitting the query to at least two of the plurality of information sources identified;

receiving a set of search results from the at least two information source for the query submitted thereto;

extracting a plurality of attributes from content in each set of search results received using information source wrappers;

specifying a first set of the plurality of attributes, which defines a main clustering strategy, and a second set of the plurality of attributes, which defines a sub-clustering strategy; each clustering strategy defining a unique set of attributes that may be extracted from the content of search results using the information source wrappers;

generating a main grouping of the sets of search results received from the information sources using the first set of attributes; the main grouping of search results including a plurality of labeled groups with a plurality of search results in each group; and generating a sub-grouping of search results for each labeled group of search results in the main grouping of search results using the second set of attributes.

2. The method according to claim 1, wherein each grouping of search results are computed using attributes of a specified clustering strategy by:

normalizing the attribute content of identified search results according to the specified clustering strategy;

stemming the normalized attribute content using a stemmer;

clustering the stems of the normalized attribute content based on their similarity; and grouping the identified search results using the clustered stems.

3. The method according to claim 2, further comprising determining each label of the plurality of labeled groups using short representative sentences in each grouping of search results.

4. The method according to claim 2, further comprising rejecting a label of the plurality of labeled groups when it contains a subset of the user-selected keywords or stop words.

5. The method according to claim 4, further comprising refining the query by augmenting the user-selected keywords with ones of the labels of the plurality of labeled groups.

6. The method according to claim 2, wherein the grouping of the identified set of search results further comprises computing a relevancy score based on the user-selected keywords in the identified set of search results to rank possible groupings.

7. The method according to claim 2, wherein the identified set of search results is grouped using the clustered stems according to one of a plurality of grouping modes.

8. The method according to claim 7, wherein the plurality of grouping modes comprise:
   a first grouping mode that defines approximately five groups that account for approximately 85% of the identified set of search results;
   a second grouping mode that defines approximately ten groups that account for approximately 65% of the identified set of search results; and
   a third grouping mode that defines approximately twenty groups that account for approximately 65% of the identified set of search results.

9. The method according to claim 2, further comprising filtering the set of search results received from each of the at least two information source by removing results that do not satisfy the query.

10. The method according to claim 9, wherein the attribute content is normalized in accordance with the specified clustering strategy.

11. The method according to claim 10, further comprising guessing the language of each set of search results to select the stemmer for the set of search results.

12. The method according to claim 11, wherein the plurality of information sources associated with the identified information domain are specified using:
   (a) a set of user-selected information sources, (b) a set of information sources automatically identified by the search engine, and (c) a combination of (a) and (b).

13. The method according to claim 12, wherein the query includes user-selected operators that define relationships between the user-selected keywords.

14. The method according to claim 13, further comprising translating at least one of the user-selected operators of the original query that is not supported by one of the plurality of information sources to an alternate operator that is supported by the one of the plurality of information sources.

15. The method according to claim 10, wherein the attribute content is normalized to an attribute specific hierarchy.

16. The method according to claim 2, wherein the main clustering strategy and the sub-clustering strategy are specified: (a) manually by a user of the search engine; (b) automatically by the search engine; or (c) a combination of (a) and (b).

17. The method according to claim 2, wherein each sub-grouping of search results includes a plurality of labeled groups and wherein the method further comprises:
   specifying a third set of the plurality of attributes, which defines a sub-sub-clustering strategy; and
   generating a sub-sub-grouping of search results for each labeled group of search results in each sub-grouping of search results using the third set of attributes.

18. The method according to claim 1, wherein the search engine is a federated search engine.

19. A method for grouping search results in an information source, comprising:
   receiving a query with user-selected keywords to be evaluated in an information domain of the information source;
   querying the information domain of the information source with the query;
   identifying a set of search results for the query submitted to the information domain of the information source;
   extracting a plurality of attributes from content in the set of search results received for the submitted query;
   specifying a first set of the plurality of attributes, which defines a main clustering strategy, and a second set of the plurality of attributes, which defines a sub-clustering strategy; each clustering strategy defining a unique set of attributes that may be extracted from the content of search results;
   generating a main grouping of the set of search results received from the information sources using the first set of attributes; the main grouping of search results including a plurality of labeled groups with a plurality of search results in each group; and
   generating a sub-grouping of search results for each labeled group of search results in the main grouping of search results using the second set of attributes.

20. A system for grouping search results received from information sources, comprising:
   a query translation module for receiving a query with user-selected keywords to be evaluated in an information domain; the query translation module identifying a plurality of information sources associated with the information domain and submitting the query to at least two of the plurality of information sources identified;
   an attribute extraction module for receiving a set of search results from the at least two information source for the query submitted thereto; the attribute extraction module extracting a plurality of attributes from content in each set of search results received using information source wrappers;
   a clustering module for specifying a first set of the plurality of attributes, which defines a main clustering strategy, and a second set of the plurality of attributes, which defines a sub-clustering strategy; each clustering strategy defining a unique set of attributes that may be extracted from the content of search results using the information source wrappers;
   wherein the clustering module generates a main grouping of the sets of search results received from the information sources using the first set of attributes;
   the main grouping of search results including a plurality of labeled groups with a plurality of search results in each group; and
   wherein the clustering module generates a sub-grouping of search results for each labeled group of search results in the main grouping of search results using the second set of attributes.

* * * * *